United States Patent [19]

Bottum

[11] 4,164,975
[45] Aug. 21, 1979

[54] HEAT EXCHANGER HOLDER

[76] Inventor: Edward W. Bottum, 9357 Spencer Rd., Brighton, Mich. 48116

[21] Appl. No.: 812,137

[22] Filed: Jul. 1, 1977

Related U.S. Application Data

[62] Division of Ser. No. 715,306, Aug. 18, 1976, Pat. No. 4,049,407.

[51] Int. Cl.² .................................................. F28F 1/32
[52] U.S. Cl. ........................................ 165/68; 165/164; 165/171; 165/172; 165/185; 248/68 R
[58] Field of Search ................ 165/162, 172, 178, 67, 165/68, 164, 171, 185; 248/68 CB, 68 R; 138/106, 111

[56] References Cited

U.S. PATENT DOCUMENTS

| | | |
|---|---|---|
| 1,334,545 | 3/1920 | Londelius, Jr. ...................... 248/68 R |
| 1,900,865 | 3/1933 | Moore ................................. 165/172 |
| 3,180,597 | 4/1965 | Havener ............................. 248/68 R |

FOREIGN PATENT DOCUMENTS 858273  1/1961  United Kingdom .................. 248/68 R

*Primary Examiner*—Sheldon Jay Richter
*Attorney, Agent, or Firm*—Whittemore, Hulbert & Belknap

[57] ABSTRACT

A heating system for a building structure is provided in which a heat pump system and at least one solar energy system and one air convector system are used. The solar energy system collects heat during the periods when sun energy is available and the air convector system collects heat when available from warm air. The heat from both systems is stored directly in the earth which surrounds the evaporator of the heat pump system.

4 Claims, 3 Drawing Figures

U.S. Patent      Aug. 21, 1979      4,164,975
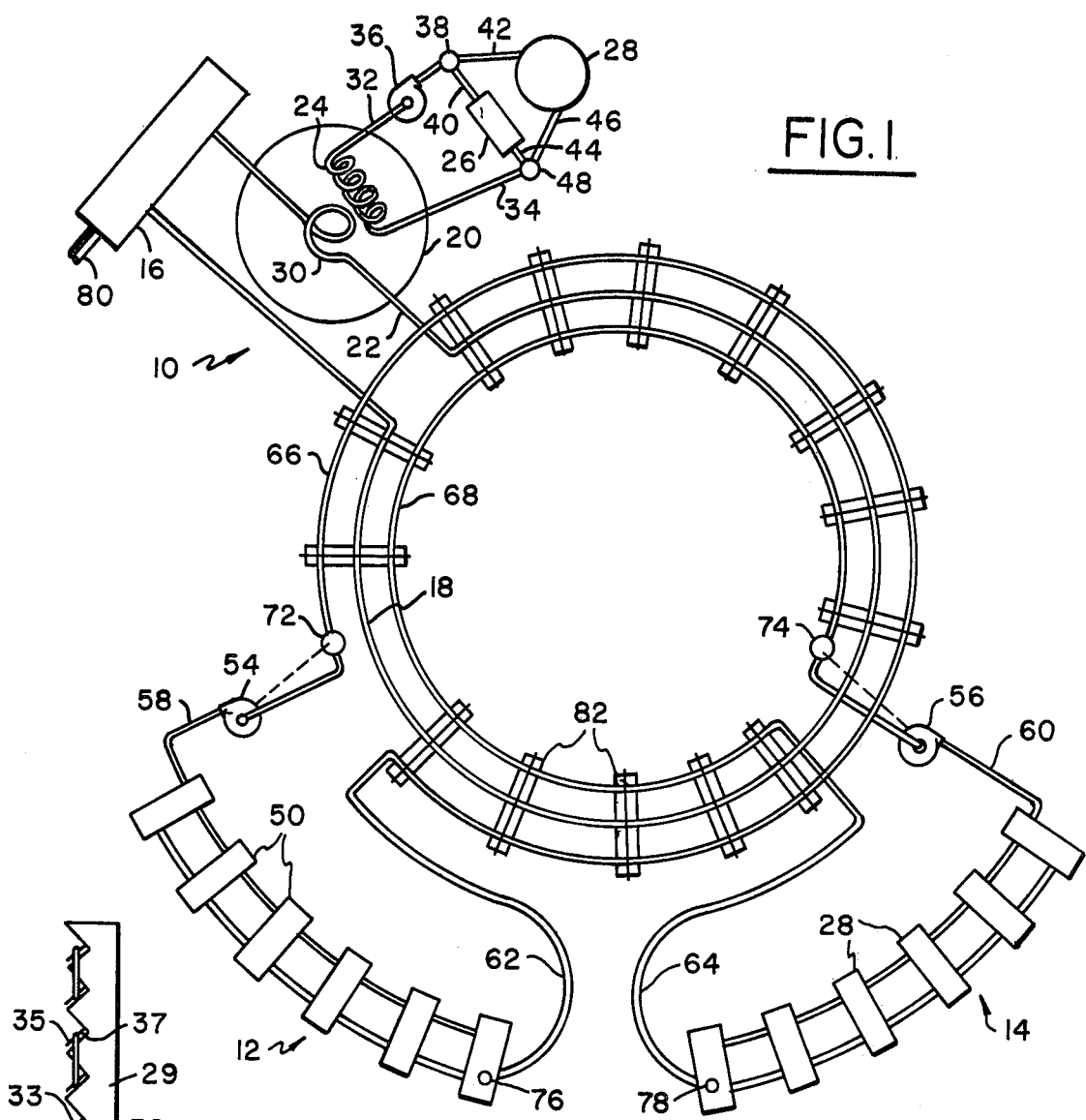
FIG.1
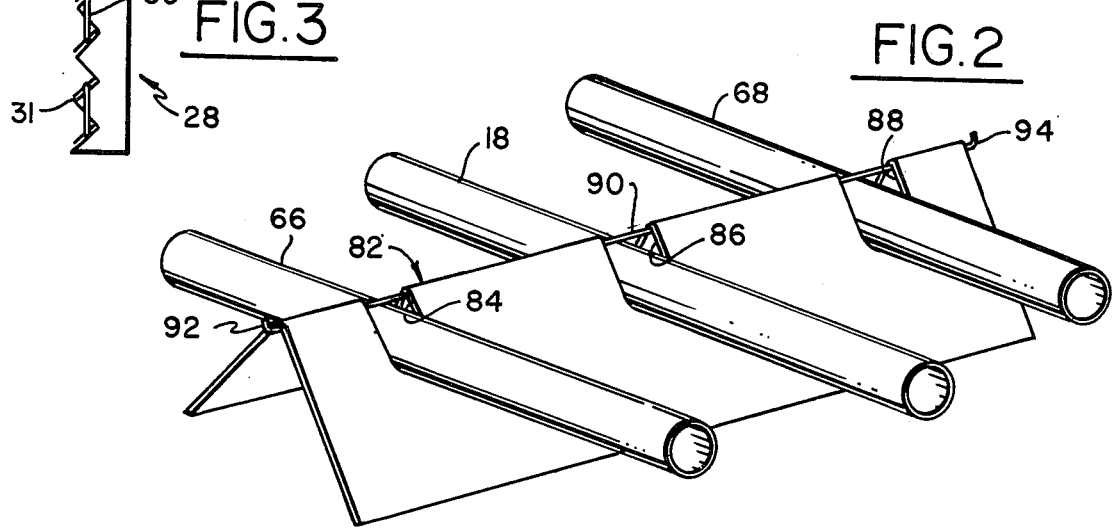
FIG.3
FIG.2

HEAT EXCHANGER HOLDER

CROSS-REFERENCE TO RELATED APPLICATION

This application is a divisional of my copending application Ser. No. 715,306, filed Aug. 18, 1976, now U.S. Pat. No. 4,049,407.

BACKGROUND OF THE INVENTION

The use of heat pumps augmented by solar energy or air convectors for the purpose of heating building structures has been known in the past. However, usage of such energy has been on a limited basis and in only certain geographical areas where either the average temperature is usually quite high as, for example, in Florida wherein air-to-air heat pumps and water-to-air heat pumps have been practical and economical or in areas where the sun energy is plentiful as in the United States south and southwest areas wherein water heating by solar energy has been used for many years.

However, in temperate and colder climates it has not been practical to use such techniques. Heat pumps perform very efficiently at outside ambient temperatures of 45, 35 or even 25 degrees Fahrenheit. However, the efficiency of heat pumps drops off as temperatures become lower, and approximately below 20° F. evaporator temperature, a heat pump is not very efficient. In some climates where an air-to-air heat pump is not practical, water-to-air heat pumps have proven satisfactory. However, such apparatus requires an adjacent river, creek, or well to be available for evaporator coils. The availability of such a water source is, of course, quite limited, thereby severely restricting the extent of use of water-to-air systems.

Also, earth-to-air heat pump systems have been used. In such cases, an evaporator coil is buried, for example, three to six feet or more deeply in the ground, to pick up heat from the ground, which is normally at a higher temperature than the air temperature, and pass this heat through a heat pump system to the air to be heated. Such a system may be quite costly because a very large evaporator coil construction is needed to contact enough ground area so that the evaporator temperature will not fall below 25° to 30° F., which is the temperature below which the heat pump will not operate efficiently.

In my copending United States patent application, Ser. No. 532,156, filed on Dec. 12, 1974, I have disclosed a structure for collecting solar energy through a solar collector during periods when such energy is available and storing it directly in the earth surrounding an evaporator which is also buried in the earth. The evaporator forms part of a heat pump system. With such a structure, when there is a day or several days when the sun shines, an excess of solar heat will be transmitted to the earth surrounding the heat pump evaporator. Cloud diffused solar energy in appreciable amounts can be stored even on cloudy days. The earth itself acts as a storage agent. The earth serves as a natural and inexpensive storage area. Many tons of earth are available at low cost to store a considerable amount of heat. Once such a mass of earth is heated, it requires many days for it to cool to its normal temperature. A similar system is disclosed in U.S. Pat. No. 2,529,154. There have been other attempts in the past to provide solar or heat pump systems for heating as are illustrated in U.S. Pat. Nos. 2,559,870; 3,262,493; 1,101,001; 1,130,870; 1,683,434; and 3,178,113, and also an article appeared in the WASHINGTON POST on Oct. 12, 1974, entitled "Heat Pump a Key to Solar Heating".

In my present invention, I have provided a novel way for utilizing at least two banks of heat collectors. Each bank is an independent heat exchange relationship with an evaporator which is buried in the earth. Additionally, novel means are provided for mounting of coils buried in the earth. A further novel feature of the invention is the provision of a water tank connected to the outlet of the evaporator which in addition to functioning as a heat reservoir, acts as a buffer to prevent excessive liquid refrigerant from returning to the compressor of the heat pump system when unusual conditions of operations are encountered.

SUMMARY OF THE INVENTION

The heating system is for a building structure and comprises a heat pump system and at least one solar energy system and one air convector system. The heat pump system includes a compressor, evaporator coil, condenser and necessary auxiliary components connected together in operative relationship. The evaporator coil is buried in the ground exteriorally of the building structure to be heated. The condenser has an outlet for connection to the building structure for transfer of heat energy thereto. The solar energy system includes a solar collector structure while the air convector system includes an air convector structure. Each system also includes a heat transfer coil and means for circulating a heat transfer medium therebetween, all connected together in operative relationship. The heat transfer coils are buried in the ground exteriorally of the building structure to be heated and adjacent to the evaporator coil. The heat transfer coils are effective to transfer heat to the surrounding mass of earth during periods of sunlight and also to transfer heat to the evaporator coil. The evaporator coil is effective to draw heat from the surrounding mass of earth and also to draw heat from the heat transfer coils. Means are provided for mounting the coils buried in the earth. A water tank is connected to the outlet of the evaporator. The water tank functions as a heat reservoir and acts as a buffer to prevent excessive liquid refrigerant from returning to the compressor of the heat pump system when unusual conditions of operation are encountered.

IN THE DRAWING

FIG. 1 is a diagrammatic plan view of one embodiment of the solar assisted heat pump system in accordance with the present invention;

FIG. 2 is a view in perspective of mounting structure for coils buried in the ground; and FIG. 3 is an end view of a convector.

Referring to FIG. 1, it will be noted that a heat pump system 10 and two heat energy collecting systems 12, 14 are provided. One system 12 is a solar energy system and the other system 14 is an air convector system. The systems are arranged for heat transfer between the heat pump system 10 and energy systems 12, 14.

The heat pump system 10 comprises a compressor and condenser structure 16. Preferably, these units are positioned in the basement or other auxiliary structures of the building which is to be heated so as to capture the heat generated as a consequence of operation of the electric motor which drives the compressor and thereby increase the over-all efficiency of the heating system.

An evaporator coil 18, illustratively a single tube formed into a circular shape, is buried in the ground desirably from three to eight feet or more beneath the ground level. A multiplicity of tubes may be used for the evaporator coil 18 if desired. One practical way of installing the evaporator coil 18 is to dig a trench around or near the structure to be heated by means of a ditch or trench digger. This is relatively inexpensively done. The evaporator coil 18 may then be simply lowered into the trench. The ends of the evaporator coil 18 are connected to the compressor/condenser structure 16 and the usual associated components.

In the illustrated system, a water tank 20 is interposed between the outlet 22 of coil 18 and the compressor/condensor structure 16. The tank 20 serves as a heat reservoir as well as a buffer between the compressor and evaporator coil 18 to prevent excessive liquid refrigerant from returning to the compressor under unusual conditions of operation. The water in tank 20 is supplementally heated by means of a coil 24 which is connected to a solar collector 26 and a convector 28. The outlet 22, which is the suction line to the compressor, is connected to a coil 30 provided within tank 20 for heat exchange with the water in the tank. The outlet 22 then proceeds to the compressor.

Water in the tank may be heated solely by means of coil 24 during periods when the solar collecting systems provide an excess of heat energy. The heat in the water of the tank may then be returned to the heat pump system during periods when there are not adequate amounts of heat collected by the solar collector. The tank 20, although relatively small, serves to provide additional heat should there be exceptionally long periods of cloudy weather.

The tank is illustratively supplementarily heated by means of the coil 24 which is located therewithin. An outlet 32 and inlet 34 extend to the coil 30. Brine water or other liquid is circulated through coil 30 by means of a pump 36. The outlet of the pump 36 is connected to a valve 38. Two outlets 40, 42 extend from valve 38. One of the outlets 40 is connected to the inlet of solar collector 26. The other outlet 42 is connected to the inlet of a convector 28. Outlets 44, 46 extend from the collector 26 and convector 28 to a second valve 48. Valve 48 is connected to the inlet 34 of the coil 30. The valves 38, 48 include control means for actuating the valves to either circulate fluid through the collector 26 or convector 28 depending upon ambient conditions. During sunny weather, fluid is circulated through the collector 26. During very cloudy periods or during the night, the valves 38, 48 are actuated to circulate fluid through the convector 28. The convector 28 is a conventional device used to collect heat, usually from natural circulation of air through the convector.

The convector 28 is illustrated in FIG. 3 by an end view thereof. This type of convector is called a solar fence. One face of the elongated support 29 is notched to provide surfaces 31 for the serpentine mounting of continuous tubing 33 having a fin 35, 37 projecting outwardly from each side thereof. The fins 35, 37 are spaced from surfaces 31 in order to permit air to circulate therearound. The fins are removed from bent portions 39 of the tubing. The air heats the fins. This heat is transferred to the tubing 33 through which fluid media is pumped. The fluid media is heated thereby. Other types of convectors may, of course, be used in accordance with the invention.

Heat exchange between the water in tank 20 and the coil 30 is also advantageous in acting as a buffer between the coil 18 and compressor. During some periods, there may be excessive liquid refrigerant returning to the compressor from the coil 24. Heating of the fluid passing from the coil 18 by means of the tank tends to vaporize such liquid refrigerant and prevent it from passing into the compressor where it could cause compressor damage. Additionally, such heat exchange permits a reduction in the size of the coil structure buried in the ground. This is important where there is a shortage of ground space for the installation.

The coil 30 may be eliminated in some circumstances and water from the tank 20 be pumped directly by means of the pump 36. The convector 28 is of particular use during the night time when the temperature of the air is higher than the temperature of the ground.

Referring now to the energy systems 12, 14, it will be noted that one system 12 includes a plurality of collectors 50 while the other system includes a plurality of convectors 28, inlets and outlets of which are interconnected so that a battery of collectors and a battery of convectors is formed. Such a battery is, of course, capable of greatly increasing the amount of heat energy which is collected. The solar collectors may be of any desirable configuration, a number of which are known in the art. One improved collector which is desirable for this invention is illustrated in my U.S. patent application, Ser. No. 586,612, filed June 13, 1975, now U.S. Pat. No. 4,026,272.

One conventional type of solar collector is a glass-covered absorber consisting of two or three inner-spaced glass plates overlying a blackened metal surface to which is attached a coil for circulation of the heat-transfer medium, generally brine water.

Brine water, which is heated in the collectors and convectors is circulated by means of the pumps 54, 56.

The inlets and outlets of the banks of solar collectors and convectors are connected to, respectively, conduits 58, 60 and 62, 64. The outlets of pumps 54, 56 are connected to conduits 58, 60. Generally circular heat transfer coils 66, 68 are buried in the ground at the same depth and closely adjacent to generally circular evaporator coil 18. Coil 68 is of smaller diameter than coil 18 and is positioned radially inwardly thereof. Coil 66 is of greater diameter than coil 18 and is positioned radially outwardly thereof, all of the coils being in generally parallel relationship. The coils are preferably about six to eight feet apart.

Sensors 72, 74 are provided at the inlets of pumps 54, 56 and sensors 76, 78 are provided at the outlets of the batteries of solar collectors and convectors, respectively. The sensors are operably connected to the respective pumps to deenergize the pumps whenever the temperature of the fluid medium flowing through any battery of collectors or convectors is higher than the ground storage temperature. The pumps for any battery will start and run only so long as heat can be stored in the ground. When the collector or convector temperature approaches the ground temperature, the circulating pumps will stop in order not to remove heat from ground storage. The two batteries will run during different parts of the day and night and result in the effective heat collecting day being appreciably lengthened with the result that much more heat may be stored.

Since more heat may be picked up and stored in this manner, the size of the underground heat exchanger and storage area may be appreciably reduced. One result is, of course, the cost of installation is reduced and the system may be used where only a small ground area is available. Another result is that since more heat may be stored in less time, the heat pump evaporator temperature will run higher and therefore the heat pump will operate more efficiently.

The evaporator coil 18 is buried in the ground desirably from three to eight feet as are the coils 66, 68. As previously mentioned, one practical way of installing the coils is to dig a trench around or near the structure to be heated by means of a ditch or trench digger. The ends of the coils are properly connected to the respective exterior structures and the usual associated components. Preferably, the exiting conduits connecting the coils to exterior components are insulated conduits so that heat will not be lost readily therefrom when transmitting fluid. An outlet 80 extends from the condenser of the heat pump system for the transmission of, illustratively, heated air to the space which is being heated. Alternately, water may also be used as a heat transmission medium.

A heat pump as is well known, is essentially a refrigeration system in reverse. In a refrigeration system, the condenser is normally located outside of the space to be cooled to thereby dissipate the heat generated in the condenser to the atmosphere. The evaporator is located in a position enabling the cooling effect thereof to be transmitted to the space to be cooled. In the heat pump system 10, the evaporator 18 is buried in the ground and absorbs heat from the surrounding earth mass as the refrigerant boils due to the reduced refrigerant pressure caused by the compressor. This heat is effectively transmitted from the condenser to the heat transmission medium, air or water, as the refrigerant is compressed and condensed.

The coils 18, 66 and 68 are positioned at a uniform distance apart by means of a plurality of spaced apart heat exchange holders 82. As illustrated in FIG. 2, the holders 82 are V-shaped and are inverted to provide a base for supporting the structure. Preferably, the holders are fabricated of a metal which has good heat conductivity properties such as copper. Three spaced apart slots 84, 86, 88 are provided extending downwardly from the apex of the V. The coils 18, 66, 68 are received in the slots which effectively space the coils apart the desired distance. An elongated tubular element 90 is inserted over the tops of the coils and the ends 92, 94 thereof are bent upwardly to thereby retain the coils in place.

The holders 82 not only positively hold the coils in proper relationship but also are effective to promote heat interchange between the three coils and also to help give off or pick up heat from the ground. During installation of the structure, the three coils may easily be unrolled and laid on top of the ground parallel to each other or in concentric circles. It should be appreciated that while the coils are illustrated as being in concentric circles other configurations such as a straight parallel arrangement and the like may be employed. The holders may then be mounted on the coils by slipping them under the coils and then members 90 may be inserted to thereby effectively pin the coils in place. The structure is then placed in the trench which has previously been dug.

It will be noted that the battery of the collectors 50 will pick up heat during sunny periods. The battery of the convectors 52 will pick up heat from the air when the air temperature is warmer than the temperature around coil 18, as in the evening and early night.

In operation of the system, the evaporator coil 18 may draw heat directly from either of the coils 66, 68 via the holders 82 and also via the earth between the coils. Direct usage of heat from the collectors and convectors would occur during periods when the sun is shining and heat energy is being generated by the collectors or when the air temperature is relatively high. The system is so designed that during such periods of heat generation, excess heat is provided, that is, heat above and beyond the requirements of the heat pump system. This excess heat is transmitted to the earth which surrounds the evaporator and heat transfer coils. This heat is dissipated in a generally cylindrical pattern surrounding the coils. The heat is stored, very little of it being permanently dissipated. As excess heat is transmitted to the earth mass, it is gradually conducted farther and farther away into the earth, raising the temperature of the surrounding cylindrical mass of earth. The rate of conduction depends upon temperature differential as well as the composition of the earth. In times when the collectors and convectors are not providing adequate heat for the requirements of the heat pump, the stored heat will return to the heat exchanger because the heat exchanger will then be at a lower temperature. In addition to the heat stored by the collector and convector systems, heat is always being conducted from the center of the earth towards the earth's surface and this is of assistance in the present system.

In utilization of the system, heat storage may take place for an extended period of time when the heat pump system is not being utilized. For example, this may occur in the fall or during a warm spell. This heat storage may raise the temperature of tons of earth. It should be appreciated that the coils are buried in trenches surrounding or adjacent to the structure which is to be heated. These coils are not buried beneath the structure. Storage beneath the structure is very limiting and expensive. Also, storage beneath a structure requires that a major portion of the system must be installed before the building structure is completed and therefore such a system would not at all be adaptable to existing buildings.

In the present instance, the coils are buried, preferably in parallel relationship, in an inexpensively dug trench. The depth to which these structures are buried depends to some extent upon the climate and the type of soil in which the units are buried.

The entire system may be reversed in the summer to provide air conditioning, it being appreciated that heat pumps are capable of either being used for cooling or for heating. Thus, the condenser becomes the evaporator and the evaporator becomes the condenser in the ground for cooling. In warmer climates where a heavy cooling load is anticipated, it is advisable to use batteries of convectors only instead of solar collectors to facilitate giving off heat.

The number of heat dissipating coils may be varied depending upon the number of collector and convector batteris. Additionally, a number of evaporator tubes may be manifolded together to form the evaporator coil.

What I claim as my invention is:

1. A heat exchanger holder for retaining at least two tubular coils in horizontal spaced apart heat exchange relationship comprising an elongated V-shaped member having an apex defining the upside thereof, said member being fabricated of sheet-like heat conductive material, said member having at least two spaced apart slots extending transversely downwardly from the apex thereof, each slot for reception of a tubular coil, and means for securing the coils in place comprising an elongated rod-like element inserted beneath said apex and above said coils having ends extending out of the ends of the V-shaped member and being bent to retain said rod-like element in place.

2. A heat exchanger holder as in claim 1, further characterized in that said member is fabricated of copper.

3. The combination comprising at least two elongated tubular coils and means for mounting and connecting said coils in horizontal spaced apart heat exchange relationship, said means comprising a plurality of heat exchanger holders for retaining said tubular coils in heat exchange relationship, each holder comprising an elongated, horizontally extending, V-shaped member having an apex defining the upside thereof, said member being fabricated of sheet-like heat conductive material, said member having at least two spaced apart slots extending downwardly from the apex thereof, each slot receiving one of the tubular coils in heat exchange relationship therewith, and means securing the coils in place comprising an elongated rod-like element inserted beneath said apex and above said coils having ends extending out of the ends of the V-shaped member and being bent to retain said rod-like element in place, said holders being spaced apart along the length of the coils.

4. A heat exchanger holder as in claim 3, further characterized in that said member is fabricated of copper.

* * * * *